United States Patent
Thimmig

[11] Patent Number: 6,017,051
[45] Date of Patent: Jan. 25, 2000

[54] CONVERTIBLE STROLLER

[76] Inventor: David Matthew Thimmig, 213 N. Catherine Ave., LaGrange, Ill. 60525

[ * ] Notice: This patent is subject to a terminal disclaimer.

[21] Appl. No.: 08/818,420

[22] Filed: Mar. 17, 1997

Related U.S. Application Data

[63] Continuation of application No. 08/392,382, Feb. 21, 1995, Pat. No. 5,611,560.

[51] Int. Cl.[7] ........................................ B62B 7/06
[52] U.S. Cl. ...................... 280/642; 280/650; 280/47.38; 280/62
[58] Field of Search ..................... 280/642, 643, 280/647, 648, 650, 30, 31, 47.19, 47.35, 47.38, 47.36, 62, 204, 278

[56] References Cited

U.S. PATENT DOCUMENTS

| | | | |
|---|---|---|---|
| 226,767 | 4/1880 | Mattern | 280/47.36 |
| 240,860 | 5/1881 | Stevens | 280/47.38 |
| 870,739 | 11/1907 | McIntyre | 280/47.36 |
| 3,866,937 | 2/1975 | Goldfarb | 280/47.38 |
| 4,909,537 | 3/1990 | Tratner | 280/278 |
| 4,934,728 | 6/1990 | Chen | 280/650 |
| 5,056,805 | 10/1991 | Wang | 280/47.36 |
| 5,076,599 | 12/1991 | Lockett et al. | 280/204 |
| 5,188,389 | 2/1993 | Baechler et al. | 280/650 |
| 5,224,720 | 7/1993 | Chaw et al. | 280/62 |
| 5,299,825 | 4/1994 | Smith | 280/650 |
| 5,611,560 | 3/1997 | Thimmig | 280/642 |
| 5,647,601 | 7/1997 | Potter et al. | 280/642 |

FOREIGN PATENT DOCUMENTS

| 12674 | 8/1911 | United Kingdom | 280/47.38 |
|---|---|---|---|

*Primary Examiner*—Lanna Mai
*Assistant Examiner*—Frank Vanaman
*Attorney, Agent, or Firm*—Mayer, Brown & Platt

[57] ABSTRACT

A stroller adapted to carry a child while a person pushing the stroller is walking or running, and which is adjustable in length from a first operable position primarily for walking in confined places to a second relatively longer operable position primarily for walking or running, and is further adjustable to a collapsed position.

28 Claims, 6 Drawing Sheets

CONVERTIBLE STROLLER

This is a continuation of application Ser. No. 08/392,382, filed on Feb. 21, 1995 now U.S. Pat. No. 5,611,560.

BACKGROUND OF THE INVENTION

1. Field of the Invention

The present invention relates generally to strollers or carriages for carrying a child, and more particularly to a stroller adapted to carry a child while a person pushing the stroller is walking or running, and which is adjustable in length from a first operable position primarily for walking in confined places to a second relatively longer operable position primarily for walking or running, and is further adjustable to a collapsed position.

2. Discussion of the Prior Art

Strollers or carriages have long been used to carry small children. Such strollers comprise numerous configurations, generally with an intention of serving one of two purposes: a) to transport a child while the stroller operator primarily engages in activities at a normal walking pace, or as a more recent development b) to transport a child while the stroller operator engages in fitness activities such as brisk walking, jogging, or running.

Generally strollers intended for walking activities are constructed with four individual or pair of relatively small diameter wheels for use at a normal walking pace over relatively smooth surfaces. The four wheels may be mounted on casters and are typically spaced apart in a compact, relatively short wheelbase, with a relatively narrow track.

In contrast, strollers intended for fitness activities are typically constructed with three larger diameter wheels having pneumatic tires and a common fixed directional orientation as opposed to casters. In addition, fitness strollers tend to have a wider track between the rear wheels, and an elongate wheelbase for more stable use at faster paces and over a greater variety of surfaces.

Both types of strollers typically embody an operable position for use and an inoperable collapsed position for transportation or storage.

Heretofore, operators using walking strollers have recognized benefits and drawbacks of such devices. Walking strollers facilitate ease of mobility in more confined places, relative compactness upon folding for more convenient transportation and storage, and may include a child carrier which is adapted to carry a child in an upright, reclined or supine position. However, the small, solid wheels are greatly impacted by surface imperfections, resulting in a firm ride and difficulty in traversing bumpy surfaces or obstacles. Moreover, the small wheels and single operable short wheelbase are not suited for the faster pace of fitness activities.

Examples of collapsible walking strollers having four sets of wheels and more than one seating position are depicted in U.S. Pat. Nos. 4,741,551, and 4,836,573.

Operators using fitness type strollers have recognized particular benefits and drawbacks of such strollers as well. Whether walking at a normal pace or engaging in faster paced fitness activities, the larger wheels with pneumatic tires provide a softer ride with lower rolling resistance and improved ability to traverse surface imperfections or obstacles. The longer wheelbase enhances stability and provides improved ability to track in a straight line.

However, fitness strollers with an elongate wheelbase are generally too long in their operable position to walk in confined places, such as store aisles, and often are not compact enough in their collapsed position for easy transportation or storage. Fitness strollers often have a child seat relatively high above the ground, resulting in the need for a wide track to maintain reasonable stability. The wide track and elongate wheelbase make walking in confined places or competing in crowded organized running events more cumbersome. Also, fitness strollers generally have a child seat that provides either an inclined or upright seating position intended for use at faster paces and over a variety of surfaces. This type of seat is not compatible with carrying a newborn or infant child lacking the physical maturity to sit or hold its head upright.

Examples of three-wheeled fitness strollers are disclosed in U.S. Pat. Nos. 5,364,119, 5,356,171, 5,301,963, 5,299,825, 5,123,670, and 5,029,891.

In view of the great differences between these two general types of strollers, a consumer wishing to carry a child in a stroller, at times, while walking in confined places, and at other times, while engaging in faster paced activities in open areas, must purchase both a walking stroller and a fitness stroller and use them independently. This is an expensive and inconvenient way to enjoy the benefits of the two types of strollers presently sold.

Given the above disadvantages of the prior art, it is a principal object of the present invention to provide a single multi-functional convertible child stroller which provides a more economical and efficient alternative to purchasing and storing two strollers having different intended uses.

Accordingly, it is an object of the present invention to provide a stroller which is adapted to carry a child while a person pushing the stroller is walking or running, and which is adjustable in length from a first operable position primarily for walking in confined places to a second relatively longer operable position primarily for walking or running.

More particularly, the present invention provides a stroller which has an elongate wheelbase, large diameter wheels and pneumatic tires for improved stability, ride and rolling resistance. The stroller provides the unique advantage of being adjustable to a relatively shorter wheelbase for improved mobility in confined places, while still employing large diameter wheels and pneumatic tires for improved ride and rolling resistance.

A stroller of the present invention would enable a user to select a shorter wheelbase for use while engaging in fitness activities when a shorter wheelbase may be desirable, such as during an organized, heavily attended running event.

Another object of the invention is to provide a stroller which has an adjustable handle extension length to provide increased distance between the stroller user and the rear of the stroller when the stroller is used primarily for running.

A further object of the invention is to provide a stroller which can be adapted to carry a child in a sitting position or in a supine position.

Yet another object of the invention is to provide a stroller having relatively few parts which can be collapsed in height, length, and width for storage or transportation.

Still another object of the present invention is to provide a stroller which has a relatively low center of gravity when carrying a child, permitting a narrower track between the rear wheels for improved mobility and storage.

SUMMARY OF THE INVENTION

The objects and advantages of the present invention are provided by a convertible child stroller comprising a frame assembly including a base frame assembly, a front wheel support assembly, a handle assembly extending rearward of the base frame assembly, a child carrier, a front wheel, and at least two rear wheels. The child carrier is mounted to the frame assembly. The front wheel is rotatably connected to the front wheel support assembly about a front axis, and the rear wheels are rotatably connected to the base frame assembly about a rear axis. The front and rear axes are parallel and spaced apart from each other such that a wheelbase length is defined by the distance between the front axis and the rear axis. The frame assembly is adjustable into a first operable position having a first wheelbase length and a second operable position having a second relatively longer wheelbase length.

In another aspect of the invention, the convertible stroller further has an adjustable handle extension length.

In another aspect of the invention, the adjustable handle extension length of the convertible stroller is automatically adjusted when the frame assembly is adjusted from the first operable position to the second operable position.

In yet another aspect of the invention, the frame assembly of the convertible stroller is adjustable between an upright position for use and a collapsed position for more convenient storage and transportation.

In still another aspect of the invention, the frame assembly of the convertible stroller is adjustable into a collapsed position having a third wheelbase length that is relatively shorter than the first wheelbase length in the first operable position.

Further features and objects of the present invention will become more fully apparent in the following description of the preferred embodiments of this invention and from the appended claims.

BRIEF DESCRIPTION OF THE DRAWINGS

In describing the preferred embodiments, reference is made to the accompanying drawings wherein like parts have like reference numerals, and wherein.

It should be understood that the drawings are not to scale and that certain aspects of the embodiments are illustrated by phantom views. Actual embodiments may differ. While considerable mechanical details of a convertible stroller, including details of fastening and/or coupling means and other plan and section views of the particular embodiments depicting the invention have been omitted, such detail is not per se part of the present invention and is considered well within the comprehension of those skilled in the art in light of the present disclosure. It should also be understood that the invention is not limited to the particular embodiments illustrated or combinations thereof.

DETAILED DESCRIPTION OF THE PREFERRED EMBODIMENTS

Referring generally to FIGS. 1–18, it will be appreciated that the present invention generally may be embodied in numerous configurations of a convertible child stroller. The first preferred embodiment is depicted in FIGS. 1–7, and is followed by second, third, and fourth alternative preferred embodiments shown in FIGS. 8–11, FIGS. 12–14, and FIGS. 15–18, respectively.

First Preferred Embodiment

Figures 1, 2B:
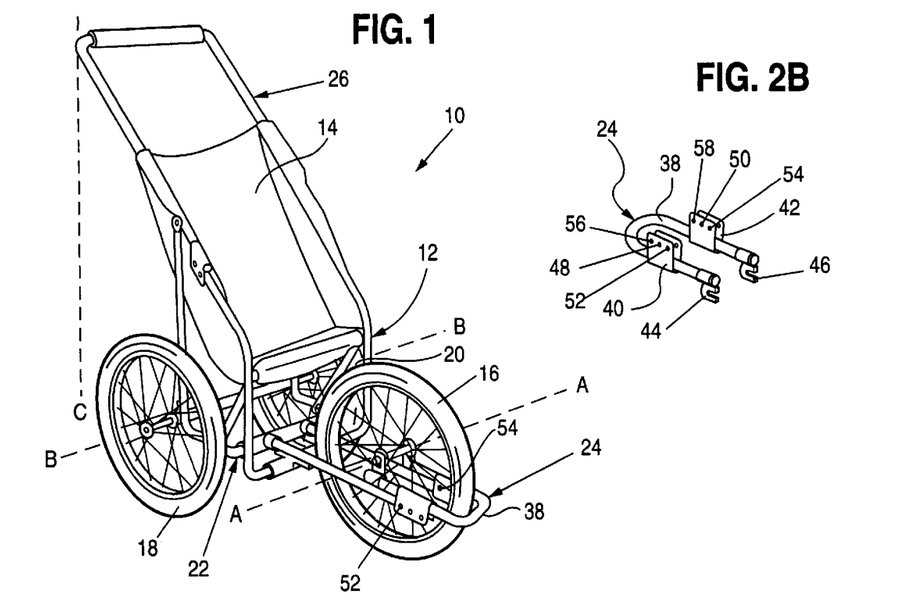
FIG. 1 is a perspective view of a first embodiment of the convertible child stroller in the first operable position with a child carrier that provides an upright seating position.
FIG. 2B is a perspective view of the front wheel support assembly of the first embodiment of the stroller when the stroller is in the second operable position.

Turning now to FIG. 1, the present invention is generally embodied in a convertible child stroller 10 which is comprised of a frame assembly 12, a child carrier 14, a front wheel 16, and rear wheels 18 and 20. The frame assembly 12 is preferably constructed of aluminum or steel tubular components joined by plastic or metal couplings or fittings.

Figures 2, 2A:
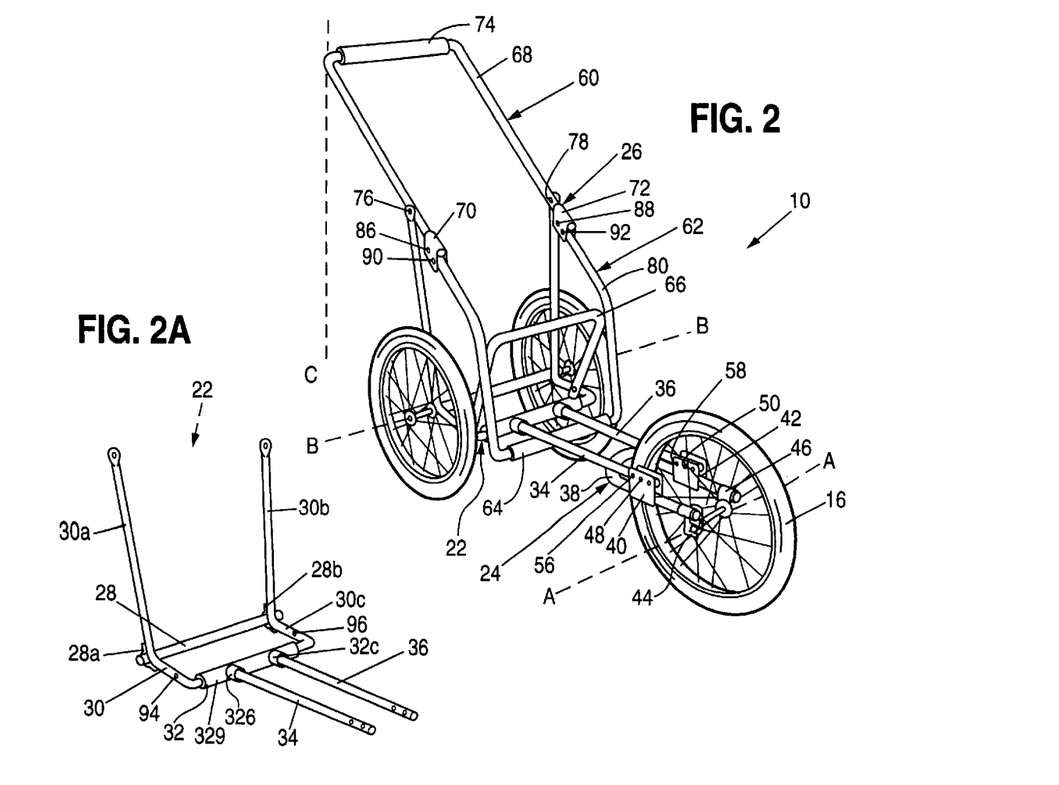
FIG. 2 is a perspective view of the first embodiment of the stroller in the second operable position with the child carrier removed.
FIG. 2A is a perspective view of the base frame assembly of the first embodiment of the stroller when the stroller is in an operable position.
Figure 3:
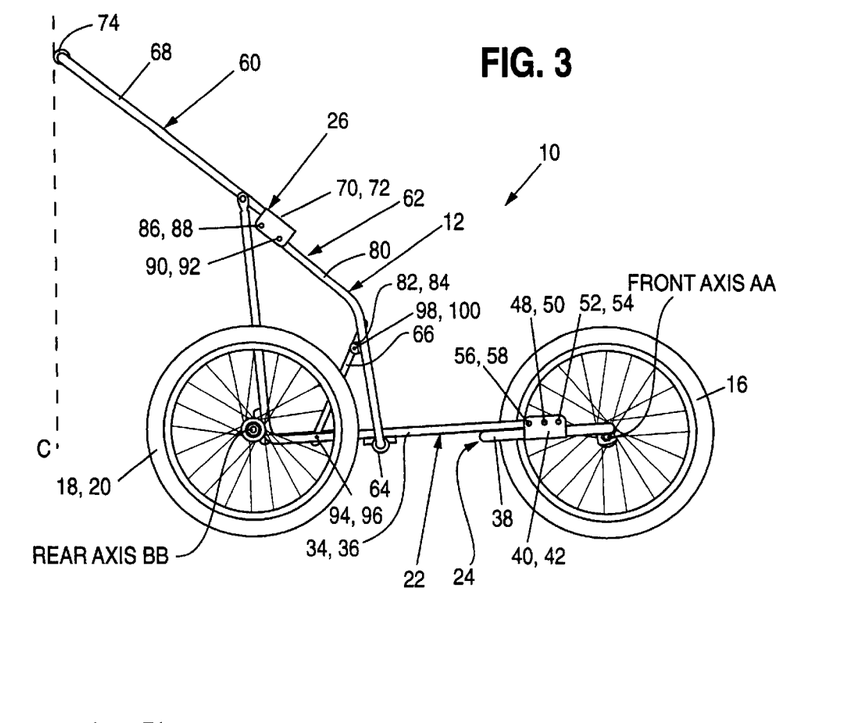
FIG. 3 is a side view of the first embodiment of the stroller in the second operable position with the child carrier removed.

The frame assembly 12, as best seen in FIGS. 2 and 3, further comprises a base frame assembly 22, a front wheel support assembly 24 and a handle assembly 26 that extends rearward of the base frame assembly 22.

As shown in FIG. 2A, the base frame assembly 22 comprises a rear cross member 28, rear member 30, rear coupling 32, and parallel front members 34 and 36. To reduce the number of components and to enhance structural rigidity, rear member 30 is preferably a single member having a series of bends resulting in substantially vertical legs 30a and 30b extending upward from a substantially horizontal U-shaped portion 30c. Straight tubular rear cross member 28 is fixedly attached to rear member 30 proximate the bends in rear member 30 from horizontal U-shaped portion 30c to upwardly extending legs 30a and 30b, respectively. Attachment of rear cross member 28 to rear member 30 is preferably by conventional means such as welding, or as best seen in FIGS. 2A and 7, by means of mounting brackets 28a and 28b which are fixedly attached to the respective ends of rear cross member 28 and to rear member 30 by rivets or the like.

Figure 7:
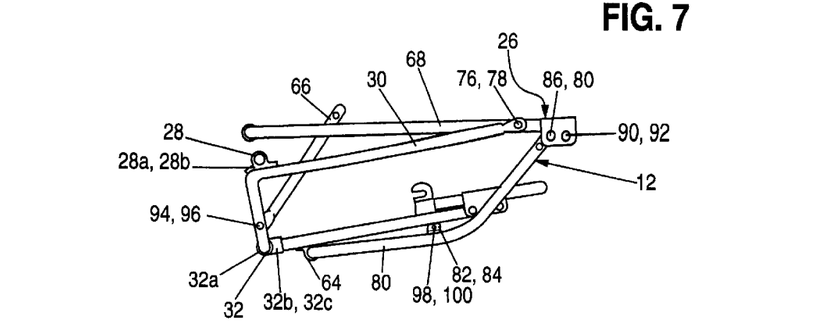
FIG. 7 is a side view of the frame assembly of the first embodiment of the stroller in its fully collapsed position.

As seen in FIGS. 2A and 7, rear member 30 is pivotally connected to front members 34 and 36 by means of rear coupling 32. Rear coupling 32 is preferably constructed of high strength plastic and includes a pivot tube 32a and two forward facing mounting tubes 32b and 32c. Front members 34 and 36 are received within and fixedly attached to mounting tubes 32b and 32c, respectively, by conventional means such as by rivets or the like. Rear member 30 pivots within pivot tube 32a.

For convenience of construction, pivot tube 32a preferably has two pieces to allow the bends in rear member 30 to be made prior to mounting pivot tube 32a around the base leg of U-shaped portion 30c of rear member 30. Alternatively, rear member 30 could be constructed of three tubular portions connected by two substantially right-angle elbow fittings. In this alternative construction, the straight base leg of horizontal U-shaped portion 30c would pivot within a unitary pivot tube 32a of rear coupling 32 and each end of the straight base leg would be joined to one of the remaining side portions (generally L-shaped) of rear member 30, via an elbow fitting and conventional fastening means.

As best seen in FIG. 2B, front wheel support assembly 24 comprises a U-shaped pivot member 38, front collars 40 and 42, and front wheel mounting brackets 44 and 46. Front collars 40 and 42, and front wheel mounting brackets 44 and 46 are fixedly attached to pivot member 38 by conventional means such as by rivets or the like.

Figure 4:
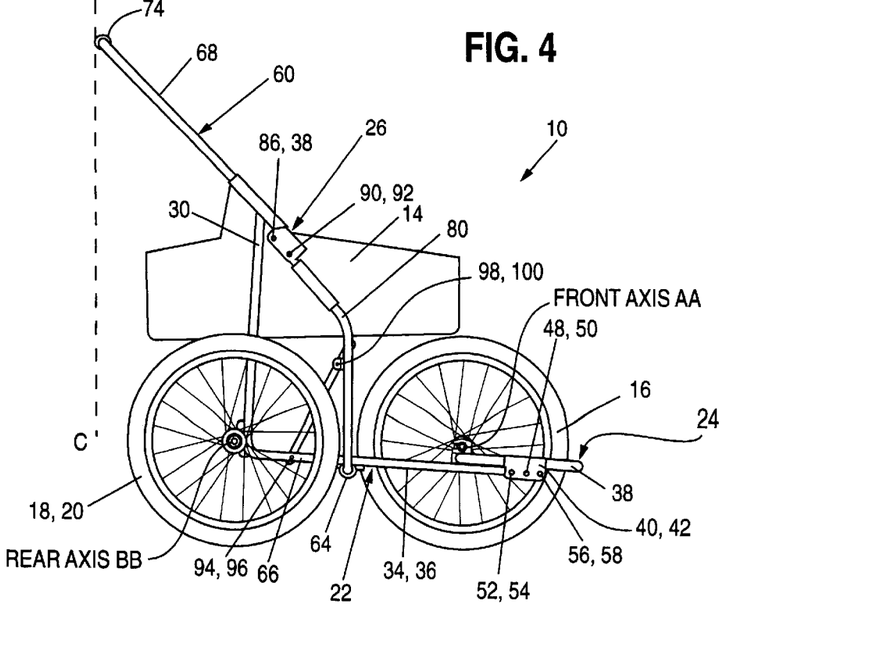
FIG. 4 is a side view of the first embodiment of the stroller in the first operable position with a child carrier that provides a supine cradle position.

Referring to FIGS. 2, 2B, 3 and 4, pivot member 38 is pivotally connected to front members 34 and 36 at pivot points 48 and 50, respectively, by pivot pin, bolt or the like. Pivot member 38 is releasably locked in a first operable position (as shown in FIGS. 1 and 4) to front members 34 and 36 at locking points 52 and 54 by conventional means such as by push pins or the like. Pivot member 38 may be unlocked and pivoted about pivot points 48 and 50 to be releasably locked at locking points 56 and 58 in a second operable position (as shown in FIGS. 2 and 3).

As best seen in FIGS. 2 and 3, handle assembly 26 comprises upper handle assembly 60, lower handle assembly 62, handle coupling 64, and U-shaped handle support member 66. Upper handle assembly 60 includes U-shaped upper handle member 68, handle collars 70 and 72, and a handle grip 74 preferably made of foam rubber or the like over its rearward most portion. Handle collars 70 and 72 are fixedly connected to the distal ends of upper handle member 68 by conventional means such as by rivets or the like.

The downwardly sloping legs of upper handle member 68 are pivotally connected to the distal ends of legs 30a and 30b of rear member 30 at pivot points 76 and 78 by pivot pin, bolt or the like.

As seen in FIGS. 2 and 7, lower handle assembly 62 includes U-shaped lower handle member 80, and (as best seen in FIGS. 3 and 7) handle support mounting brackets 82 and 84. U-shaped lower handle member 80 pivots within handle coupling 64.

Handle coupling 64 is preferably constructed of high strength plastic and is fixedly attached to front members 34 and 36 by conventional means such as by rivets or the like. Handle coupling 64 is also preferably of two piece construction to permit the bends to be made in lower handle member 80 prior to mounting handle coupling 64 around lower handle member 80. Alternatively, lower handle member 80 could be constructed of three tubular portions connected by two substantially right-angle elbow fittings. In this alternative construction, the straight base leg of U-shaped lower handle member 80 would pivot within a unitary handle coupling 64 and each end of the straight base leg of lower handle member 80 would be joined to one of the remaining legs of lower handle member 80, via an elbow fitting and conventional fastening means.

The distal ends of lower handle member 80 are pivotally connected to handle collars 70 and 72 of upper handle assembly 60 at pivot points 86 and 88, respectively, by pivot pin, bolt or the like. Upper handle member 68 may be releasably locked in an operable position (as shown in FIGS. 2 and 3) to lower handle member 80 at locking points 90 and 92 by conventional means such as push pins or the like. Upper handle member 68 may be unlocked at locking points 90 and 92 to facilitate a collapsed position as shown in FIG. 7.

As best seen in FIGS. 2A and 3, the distal ends of the legs of U-shaped handle support member 66 are pivotally connected to rear member 30 at pivot points 94 and 96, respectively, by pivot pin, bolt or the like. U-shaped handle support member 66 may be releasably connected to handle support mounting brackets 82 and 84 on the upward extending legs of U-shaped lower handle member 80 at locking points 98 and 100 by conventional means such as by push pins or the like.

One skilled in the art will appreciate that handle assembly 26 is preferably constructed of U-shaped tubular components to reduce the number of components, enhance structural rigidity, and enhance the cooperation between the right and left sides of frame assembly 12 when pivoting between operable and collapsed positions.

Child carrier 14, seen in FIG. 1, is preferably constructed of a flexible material and is releasably attached to handle assembly 26 of frame assembly 12 along upper handle member 68, lower handle member 80 and the base leg of U-shaped handle support member 66 by conventional means such as by snap or hook and loop type fasteners, or the like. Child carrier 14 may be configured to provide an upright seating position, as shown in FIG. 1, a supine cradle position, as shown in FIG. 4, or may be configured to be adjustable from a supine position to an upright seating position by means of different fastening positions (not shown) or by including additional adjustable hardware such as the child support device shown in U.S. Pat. No. 4,836,573, or the seat and backrest structure shown in U.S. Pat. No. 4,741,551, or the like.

It will be appreciated that with a child carrier 14 that provides a supine position, stroller 10 could be used as a conventional walking stroller with a newborn or infant child. After the child develops sufficient neck strength, the stroller operator could use stroller 10 for fitness activities with a child carrier 14 that provides an inclined or more upright seating position.

As seen in FIG. 1, front wheel 16 is rotatably connected to pivot member 38 of front wheel support assembly 24 at front wheel mounting brackets 44 and 46 about a front axis AA. To permit maximum collapsibility for transportation or storage front wheel 16 is preferably releasably connected to mounting brackets 44 and 46 by a quick releasing axle means such as that commonly used with bicycles.

Rear wheels 18 and 20 are rotatably connected to the respective ends of tubular rear cross member 28 about a rear axis BB which is parallel to front axis AA. To permit maximum collapsibility for transportation or storage rear wheels 18 and 20 are preferably connected to rear cross member 28 by releasable axle means such as that shown and described in U.S. Pat. No. 5,364,119, or that shown in U.S. Pat. No. 5,029,891, or the like.

One skilled in the art will appreciate that relatively larger wheels are advantageous in terms of rolling resistance but disadvantageous in terms of packaging size. Taking this and the availability of existing components into account, it is preferable that all three wheels 16, 18 and 20 are approximately 16 inches in diameter and include a pneumatic tire to provide improved comfort and durability. However, the configuration of frame assembly 12 could be modified to accommodate relatively smaller or larger wheels, or a combination of a smaller front wheel 16 and relatively larger rear wheels 18 and 20.

As shown in FIGS. 1 and 4, for improved stability the lowest point of child carrier 14, regardless of its configuration, is preferably closer to the ground than the top of rear wheels 18 and 20. This provides a low center of gravity which allows rear wheels 18 and 20 to be relatively close together, enhancing maneuverability in confined places.

Turning now to FIGS. 1 and 4, when a stroller operator wishes to use the convertible child stroller 10 in relatively confined spaces, or in a heavily crowded fitness activity, the operator may choose a first operable position whereby pivot member 38 of front wheel support assembly 24 is locked to front members 34 and 36 at locking points 52 and 54. This provides a first wheelbase length defined by the distance between the front axis AA of front wheel 16 and the parallel rear axis BB of rear wheels 18 and 20.

As seen in FIG. 4, when in the first operable position, the forward portion of front members 34 and 36 are located generally below the axis of front wheel 16 (front axis AA seen in FIG. 1). Stroller 10 has a first handle position having a first handle extension length defined by the distance between the axis of rear wheels 18 and 20 (rear axis BB seen in FIG. 1) and an imaginary vertical plane C that is parallel to rear axis BB and passes through the rearward most portion of handle grip 74 at the top of upper handle member 68.

Given a desire to use the stroller 10 for less confined fitness activities or in open spaces, the operator may choose a second operable position, shown in FIGS. 2 and 3, by unlocking pivot member 38 at locking points 52 and 54, rotating pivot member 38 about pivot points 48 and 50 to extend front wheel 16 forward, and locking pivot member 38 to front members 34 and 36 at locking points 56 and 58. Moving pivot member 38 to the second operable position causes the distance between the front axis AA of front wheel 16 and the rear axis BB of rear wheels 18 and 20 to increase, resulting in a longer wheelbase length than when stroller 10 is in the first operable position.

As seen in FIGS. 2 and 3, moving pivot member 38 to the second operable position also causes the forward portion of front members 34 and 36 to be moved to a position generally above the front axis AA of front wheel 16. The movement of front members 34 and 36 relative to front axis AA seen in FIG. 2 causes frame assembly 12 to pivot about the rear axis BB of rear wheels 18 and 20, resulting in a second handle position having a relatively longer handle extension length between rear axis BB and imaginary vertical plane C. It will be appreciated that the difference in handle extension lengths between the first operable position and the second operable position is a matter of design discretion subject to the lengths of front members 34 and 36, the length of pivot member 38, the location of pivot points 48 and 50 along the length of pivot member 38, and the location of the front wheel mounting position in front wheel mounting brackets 44 and 46.

The longer wheelbase length and longer handle extension length of the second operable position of stroller 10 relative to its first operable position can be appreciated by comparing FIGS. 3 and 4. The second handle position having a relatively longer handle extension length provides a greater distance between the striding legs of an operator and the stroller 10. To take advantage of the greater stability and straighter tracking of a longer wheelbase during fitness activities, the difference in wheelbase lengths between the first and second operable positions is preferably at least 7 inches.

Figure 5:
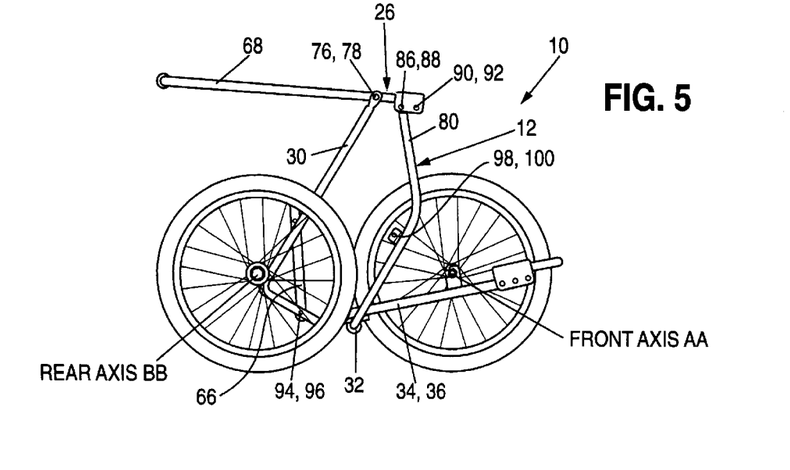
FIG. 5 is a side view of the first embodiment of the stroller in a partially collapsed position with the child carrier removed.
Figure 6:
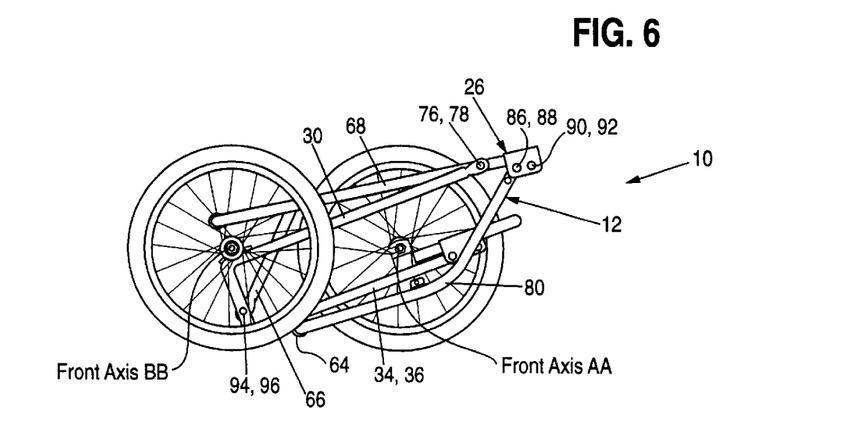
FIG. 6 is a side view of the first embodiment of the stroller in its fully collapsed position with the child carrier removed.

FIGS. 4–6 show various stages of the collapse of stroller 10 for transportation or storage. To achieve the smallest possible collapsed configuration, it is preferable to collapse stroller 10 from the first operable position shown in FIG. 4. To collapse stroller 10 the operator must first unlock handle assembly 26 by unlocking handle support member 66 from lower handle member 80 at locking points 98 and 100, and by unlocking lower handle member 80 from upper handle member 68 at locking points 90 and 92.

As best seen in FIGS. 5 and 6, once handle assembly 26 is unlocked and handle support member 66 is able to pivot rearward at pivot points 94 and 96, upper handle member 68 will tend to move toward the ground, collapsing frame assembly 12 by the simultaneous pivoting action of upper handle member 68 relative to rear member 30 at pivot points 76 and 78, upper handle member 68 relative to lower handle member 80 at pivot points 86 and 88, lower handle member 80 relative to front members 34 and 36 at handle coupling 64, and (as best seen in FIG. 7) rear member 30 relative to front members 34 and 36 at rear coupling 32.

As seen in FIGS. 4–6, the collapsing of frame assembly 12 causes a decrease in the distance between the front axis AA of front wheel 16 and the rear axis BB of rear wheels 18 and 20, resulting in a third wheelbase length which is relatively shorter than the wheelbase length of stroller 10 in the first operable position. The shorter wheelbase length and the reduction in overall height and length of stroller 10 in the collapsed position can be appreciated by comparing FIGS. 4 and 6.

As seen in FIG. 7, when stroller 10 is fully collapsed, front wheel 16 and rear wheels 18 and 20 may be removed, resulting in a reduction in width and permitting greater transportation or storage options.

It will be appreciated that, although not shown, stroller 10, as well as the alternative second, third, and fourth embodiments described below, could be configured to carry two occupants, and preferably is equipped with safety and comfort features commonly found in the art, for example, a releasable child restraining seat belt, a front wheel shroud, a step plate/foot rest, a parking brake, a braking system, lights or reflectors, shock absorptive struts, bug netting, a sun or rain canopy, a carrying tray or basket, and child carrier pockets.

Second Preferred Embodiment

Figures 8, 9, 10, 11:
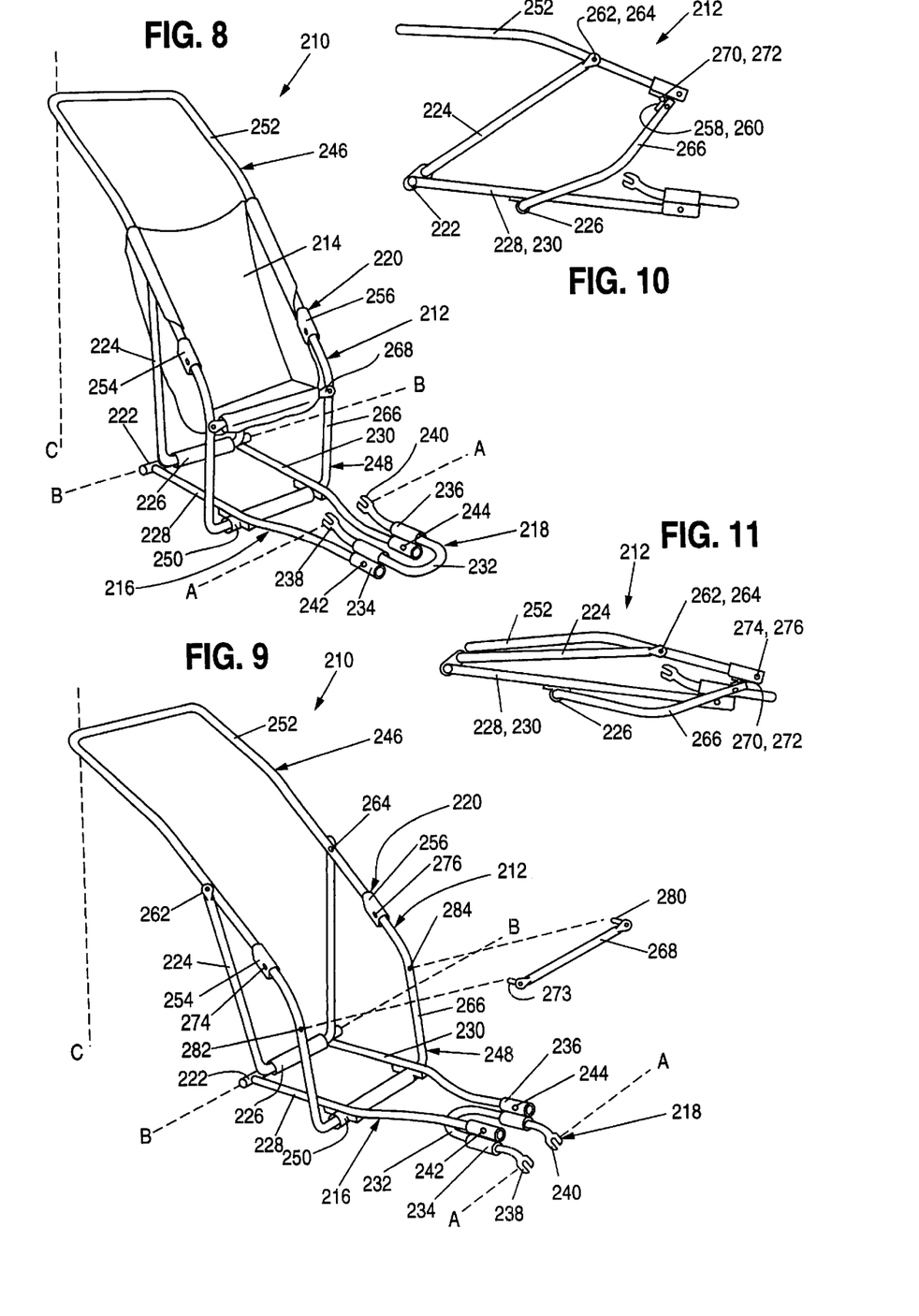
FIG. 8 is a perspective view of a second preferred embodiment of the convertible child stroller in the first operable position with a child carrier that provides an upright seating position and with the wheels removed.
FIG. 9 is a perspective view of the frame assembly of the second embodiment of the stroller in the second operable position and with an exploded view of the lateral support member.
FIG. 10 is a side view of the frame assembly of the second embodiment of the stroller in a partially collapsed position.
FIG. 11 is a side view of the frame assembly of the second embodiment of the stroller in its fully collapsed position.

Turning now to FIG. 8, an alternative second preferred embodiment of the present invention is shown without wheels. More particularly, a convertible stroller 210 (shown without wheels) comprises a frame assembly 212, and a child carrier 214. The preferred materials used for the various components of the first preferred embodiment, as well as the preferred methods of connecting those components, apply to stroller 210 of the second preferred embodiment and will therefore not be repeated hereafter.

The frame assembly 212, best seen in FIG. 9, further comprises a base frame assembly 216, a front wheel support assembly 218, and a handle assembly 220 that extends rearward of the base frame assembly 216.

The base frame assembly 216 comprises a rear cross member 222, U-shaped rear member 224, rear coupling 226, and side frame members 228 and 230. Straight tubular rear cross member 222 is fixedly attached to the rear end of side frame members 228 and 230, respectively. U-shaped rear member 224 is pivotally connected to rear cross member 222 by means of rear coupling 226. Rear coupling 226 is fixedly attached to rear cross member 222, and U-shaped rear member 224 pivots within rear coupling 226.

Rear coupling 226 preferably has two pieces to allow the bends in rear member 224 and the connection of rear cross member 222 to side frame members 228 and 230 to be made prior to mounting rear coupling 226 around rear cross member 222 and rear member 224. Alternatively, rear coupling 226 could be of unitary construction, providing two parallel tubes, one to allow the base leg of U-shaped rear member 224 to pivot within it and a second for fixed attachment to rear cross member 222. In this alternative construction, rear cross member 222 could be fixedly attached to rear coupling 226 before being fixedly attached to side frame members 228 and 230. Similarly, rear member 224 could be constructed of three tubular portions connected by two substantially right-angle elbow fittings, whereby a base leg portion of rear member 224 is inserted into rear coupling 226 and then connected to the remaining two side portions.

The front wheel support assembly 218 comprises a front U-shaped member 232, and front couplings 234 and 236. Front U-shaped member 232 has fork portions 238 and 240 at its distal ends. Front couplings 234 and 236 are fixedly attached to front U-shaped member 232 and removably slidingly engaged with side frame members 228 and 230 of base frame assembly 216. Front wheel support assembly 218 is releasably locked in a first operable position (as shown in FIG. 8) to side frame members 228 and 230 at locking points 242 and 244. Front couplings 234 and 236 of front wheel support assembly 218 may be unlocked, slidingly disengaged from side frame members 228 and 230, and front wheel support assembly 218 may be inverted and reengaged with side frame members 228 and 230 to be locked at locking points 242 and 244 in a second operable position (as shown in FIG. 9).

As best seen in FIGS. 8 and 9, handle assembly 220 comprises upper handle assembly 246, lower handle assembly 248, and handle coupling 250.

Upper handle assembly 246 includes U-shaped upper handle member 252, handle collars 254 and 256, and hinges 258 and 260 (shown in FIG. 10). Handle collars 254 and 256, and hinges 258 and 260 are fixedly attached to the distal ends of upper handle member 252. The downwardly sloping legs of upper handle member 252 are pivotally connected to the distal ends of rear member 224 at pivot points 262 and 264 (best seen in FIG. 9).

Lower handle assembly 248 includes U-shaped lower handle member 266, and lateral support member 268 (shown in FIG. 8, and in exploded view in FIG. 9). U-shaped lower handle member 266 pivots within handle coupling 250 which is fixedly attached to side frame members 228 and 230.

Handle coupling 250 is preferably of two piece construction to permit the bends to be made in lower handle member 266 prior to mounting handle coupling 250 around lower handle member 266. Alternatively, lower handle member 266 could be constructed of three tubular portions connected by two substantially right-angle elbow fittings. In this alternative construction, the straight base leg of U-shaped lower handle member 266 would pivot within handle coupling 250 of unitary construction, and each end of the straight base leg of lower handle member 266 would be joined to one of the remaining legs of lower handle member 266, via an elbow fitting.

As best seen in FIG. 10, hinges 258 and 260 are fixedly attached to the distal ends of lower handle member 266, and pivotally connect upper handle member 252 to lower handle member 266 at pivot points 270 and 272. As seen in FIG. 9, upper handle member 252 may be releasably locked in an operable position by locking upper handle member 252 to lower handle member 266, at locking points 274 and 276 in handle collars 254 and 256. Upper handle member 252 may be unlocked at locking points 274 and 276 to facilitate the collapsed position shown in FIG. 11.

As best seen in FIG. 9, lateral support member 268 is removably connected to lower handle member 266. Pins 278 and 280 at the ends of lateral support member 268 insert into holes 282 and 284 in lower handle member 266. Lateral support member 268 is removable to permit handle assembly 220 to pivot forward without contacting the front wheel (not shown) when stroller 210 is being collapsed, as shown in FIGS. 10 and 11.

Child carrier 214, seen in FIG. 8, is releasably attached to handle assembly 220 of frame assembly 212 along the sides of upper handle member 252 and lateral support member 268. Although not shown, child carrier 214 is preferably releasably tethered to rear cross member 222 by a belt with locking clasp to maintain positive engagement of pins 278 and 280 of lateral support member 268 with holes 282 and 284 of lower handle member 266 (shown in FIG. 9) while stroller 210 is in an operable position. As with the first preferred embodiment, alternative configurations may be used for child carrier 214.

Referring to FIG. 8, it can be appreciated that a front wheel (not shown) would be rotatably connected to front U-shaped member 232 of front wheel support assembly 218 at fork portions 238 and 240 about a front wheel axis AA. The front wheel of the second preferred embodiment need not incorporate a quick releasing axle means such as that suggested in the description of the first preferred embodiment, because front wheel support assembly 218 itself may be readily unlocked at locking points 242 and 244 and removed from side frame members 228 and 230.

It can also be appreciated that two rear wheels (not shown) would be rotatably connected to the respective ends of rear cross member 222 about a rear axis BB which is parallel to front axis AA. The rear wheels would be releasably connected to rear cross member 222 in the same manner described in reference to the first preferred embodiment.

When a stroller operator wishes to use the convertible child stroller 210 in relatively confined spaces, the operator may choose a first operable position, shown in FIG. 8, whereby front U-shaped member 232 of front wheel support assembly 218 is locked to side frame members 228 and 230 at locking points 242 and 244. This provides a first wheelbase length defined by the distance between front axis AA of the front wheel and the parallel rear axis BB of the rear wheels.

When in the first operable position, the forward portion of side frame members 228 and 230 are located generally below front axis AA of the front wheel. Stroller 210 has a first handle position having a first handle extension length defined by the distance between the rear axis BB and an imaginary vertical plane C that is parallel to rear axis BB and passes through the rearward most portion of upper handle member 252.

Given a desire to use the stroller 210 for fitness activities or in open spaces, the operator may choose a second operable position. The second operable position may be attained by unlocking front wheel support assembly 218 at locking points 242 and 244, slidingly disengaging front wheel support assembly 218 from side frame members 228 and 230, and then inverting and reengaging front couplings 234 and 236 of front wheel support assembly 218 with side frame members 228 and 230 to be locked at locking points 242 and 244 in the second operable position shown in FIG. 9.

Inverting front wheel support assembly 218 to extend the front wheel forward to attain the second operable position causes the distance between front axis AA of the front wheel and rear axis BB of the rear wheels to increase, resulting in a longer wheelbase length than when stroller 210 is in the first operable position.

As seen in FIG. 9, inverting front wheel support assembly 218 to achieve the second operable position also causes the forward portion of side frame members 228 and 230 to be moved to a position generally above front axis AA of the front wheel. The movement of front members 228 and 230 relative to front axis AA causes frame assembly 212 to pivot about the rear axis BB, resulting in a second handle position having a relatively longer handle extension length between rear axis BB and imaginary vertical plane C. It will be appreciated that the difference in handle extension lengths between the first operable position and the second operable position is a matter of design discretion subject to the lengths of the forward portion of side frame members 228 and 230, the length of front U-shaped member 232, the location of pivot points 242 and 244 along the length of front U-shaped member 232, and the bends in front U-shaped member 232 between fork portions 238 and 240 and front couplings 234 and 236, respectively.

Stroller 210 may be collapsed for transportation or storage. To achieve the smallest possible collapsed configuration, it is preferable to collapse stroller 210 from the first operable position shown in FIG. 8. To collapse stroller 210 the operator must first unlock handle assembly 220 by unlocking lower handle member 266 from upper handle member 252 at locking points 274 and 276. Next, the operator must unlock the clasp on the belt (not shown) that tethers child carrier 214 to rear cross member 222. The operator then must disengage lateral support member 268 from lower handle member 266, and allow lateral support member 268 (which is connected to the child carrier 214) to hang freely from handle assembly 220 while stroller 210 is collapsed. The need to unlock the clasp on the belt that tethers child carrier 214 to rear cross member 222 serves an added safety feature by ensuring that stroller 210 cannot be inadvertently collapsed by unlocking lower handle member 266 from upper handle member 252 at locking points 274 and 276 alone.

As best seen in FIGS. 10 and 11, once handle assembly 220 and the clasp on the belt (not shown) that tethers child carrier 214 to rear cross member 222 are unlocked, upper handle member 252 will tend to move toward the ground, collapsing frame assembly 212 by the simultaneous pivoting action of upper handle member 252 relative to rear member 224 at pivot points 262 and 264, upper handle member 252 relative to lower handle member 266 at pivot points 270 and 272, lower handle member 266 relative to side frame members 228 and 230 at handle coupling 250, and rear member 224 relative to rear cross member 222 at rear coupling 226.

As seen in FIG. 11, the height and length of stroller 210 are reduced in the fully collapsed position. It can be appreciated that with the front wheel and rear wheels removed, the width of stroller 210 will be reduced, while permitting greater transportation or storage options.

Third Preferred Embodiment

Figures 12, 12A:
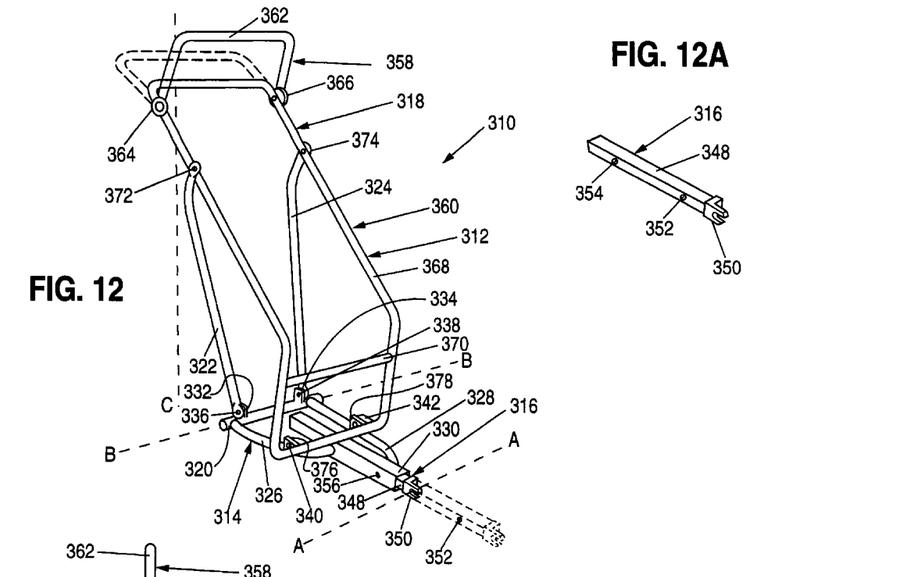
FIG. 12 is a perspective view of the frame assembly of a third preferred embodiment of the convertible child stroller in the first operable position, and with a second operable position shown in phantom.
FIG. 12A is a perspective view of the front wheel support assembly of the third embodiment of the stroller.

Turning now to FIG. 12, an alternative third preferred embodiment of the present invention is shown as stroller 310 without wheels or a child carrier. More particularly, FIG. 12 shows the frame assembly 312 of convertible stroller 310. The preferred materials used for the various components of the first preferred embodiment, as well as the preferred methods of connecting those components, apply to stroller 310 of the third preferred embodiment and will therefore not be repeated hereafter.

The frame assembly 312, best seen in FIG. 12, further comprises a base frame assembly 314, a front wheel support assembly 316, and a handle assembly 318 that extends rearward of the base frame assembly 314.

The base frame assembly 314 comprises a rear cross member 320, rear uprights 322 and 324, right frame member 326, left frame member 328, and front tube 330. Tubular rear cross member 320 is fixedly attached to the rear end of right and left frame members 326 and 328, respectively. Upright rear mounting tabs 332 and 334 are fixedly attached to rear cross member 320. Rear uprights 322 and 324 are pivotally connected to rear mounting tabs 332 and 334 at pivot points 336 and 338. Upright front mounting tabs 340 and 342 are fixedly attached to right and left frame members 326 and 328, respectively. Front mounting tabs 340 and 342 have locking holes 344 and 346, respectively (best seen in FIG. 13). Front tube 330 is preferably a square shaped tube. The front end of right frame member 326 is fixedly attached toward the rear end of the right side of front tube 330. The front end of left frame member 328 is fixedly attached toward the front end of the left side of front tube 330. This results in an asymmetric base frame assembly 314.

The front wheel support assembly 316 comprises a square-shaped front extension tube 348, and a front wheel mounting bracket 350. Front wheel mounting bracket 350 is fixedly attached to the front end of front extension tube 348. Front extension tube 348 includes first and second conventional locking means 352 and 354, such as push pins or the like (best seen in FIG. 12A). Front extension tube 348 is slidingly engaged with front tube 330, and selectively releasably locked to front tube 330 at locking point 356 via first locking means 352 or second locking means 354. Front wheel support assembly 316 is releasably locked to front tube 330 in a first operable position, shown in FIG. 12, by engagement of first locking means 352 at locking point 356. Front wheel support assembly 316 may be unlocked to slide front extension tube 348 forward to engage second locking means 354 at locking point 356 to lock front wheel support assembly 316 in a second operable position (shown in phantom in FIG. 12).

As best seen in FIG. 12, handle assembly 318 comprises upper handle assembly 358, and lower handle assembly 360.

Upper handle assembly 358 includes U-shaped upper handle member 362, and handle locking means 364 and 366. Handle locking means 364 and 366 are preferably of the conventional mating spline type, such as that described in U.S. Pat. No. 5,364,119, to pivotally connect upper handle assembly 358 to lower handle assembly 360, while providing selective positioning of upper handle member 362. With handle locking means 364 and 366 of the preferred type, a first spline portion would be fixedly attached to the distal ends of upper handle member 362, while a second spline portion would be fixedly attached to lower handle assembly 360 as described below.

Lower handle assembly 360 includes lower handle member 368, and lateral support member 370. Lower handle member 368 has a closed-loop rectangular-shape to enhance the structural rigidity of handle assembly 318. The second spline portion of handle locking means 364 and 366 of upper handle assembly 358 would be fixedly attached toward the upper end of the downwardly sloping sides of lower handle member 368. The downwardly sloping sides of lower handle member 368 are pivotally connected to the upper ends of rear uprights 322 and 324 at pivot points 372 and 374, respectively. Lateral support member 370 is fixedly attached between the side members of lower handle member 368. Handle mounting tabs 376 and 378 are fixedly attached to the rearward side of the lower cross member of lower handle member 368. Handle mounting tabs 376 and 378 have locking holes 380 and 382, respectively (best seen in FIG. 13).

Handle assembly 318 may be releasably locked in an upright operable position (as shown in FIG. 12) by aligning the respective locking holes 380 and 382 in handle mounting tabs 376 and 378 with locking holes 344 and 346 in front mounting tabs 340 and 342 of base frame assembly 314, and inserting a locking pin, bolt or the like therethrough.

A child carrier (not shown) would be releasably attached to handle assembly 318 of frame assembly 312 along lower handle member 368 and lateral support member 370. As with the first preferred embodiment, various child carrier configurations may be used.

Referring to FIG. 12, it can be appreciated that a front wheel (not shown) would be rotatably connected to the right side of front wheel mounting bracket 350 of front wheel support assembly 316 about a front wheel axis AA. It will be appreciated that the asymmetric configuration of base frame assembly 314 would permit the front wheel to nest along front tube 330 when front wheel support assembly 316 is in the first operable position. This enhances the structural rigidity of frame assembly 312 by minimizing the distance between front tube 330 and front wheel mounting bracket 350 in both the first and second operable positions.

The front wheel of the third preferred embodiment may incorporate a quick releasing axle means such as that suggested in the description of the first preferred embodiment, but it will be appreciated that front wheel support assembly 316 itself may be readily unlocked at locking point 356 and removed from front tube 330.

It can also be appreciated that two rear wheels (not shown) would be rotatably connected to the respective ends of rear cross member 320 about a rear axis BB which is parallel to front axis AA. The rear wheels would be releasably connected to rear cross member 320 in the same manner described in reference to the first preferred embodiment.

When a stroller operator wishes to use the convertible child stroller 310 in relatively confined spaces, the operator may choose a first operable position whereby front extension tube 348 of front wheel support assembly 316 is locked in a retracted position via engagement of first locking means 352 with front tube 330 at locking point 356. This provides a first wheelbase length defined by the distance between front axis AA of the front wheel and the parallel rear axis BB of the rear wheels.

The operator may also choose a first handle position by unlocking handle locking means 364 and 366 and moving upper handle member 362 to a forward position as shown in FIG. 12. When in this forward position, handle assembly 318 has a first handle extension length defined by the distance between the rear axis BB and an imaginary vertical plane C that is parallel to rear axis BB and passes through the rearward most portion of upper handle member 362.

Given a desire to use the stroller 310 for fitness activities or in open spaces, the operator may choose a second operable position. The second operable position may be attained by unlocking front wheel support assembly 316 at locking point 356 and sliding front extension tube 348 forward to engage second locking means 354 (shown in FIG. 12A) at locking point 356 (shown in phantom in FIG. 12) in an extended position. Sliding front extension tube 348 forward to attain the second operable position causes the distance between the front axis AA and rear axis BB to increase, resulting in a longer wheelbase length than when stroller 310 is in the first operable position.

The operator may choose a second handle position by unlocking handle locking means 364 and 366 and moving upper handle member 362 to a rearward position (shown in phantom in FIG. 12). When moved to this second position, handle assembly 318 has a relatively longer second handle extension length between rear axis BB and imaginary vertical plane C.

Figures 13, 14:
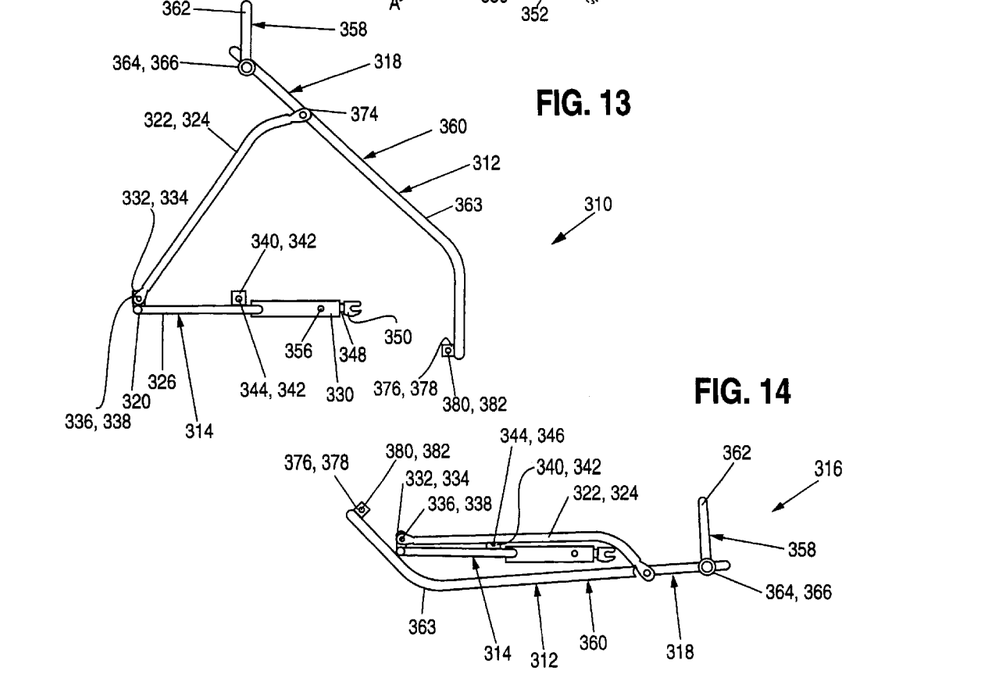
FIG. 13 is a side view of the frame assembly of the third embodiment of the stroller in a partially collapsed position.
FIG. 14 is a side view of the frame assembly of the third embodiment of the stroller in its fully collapsed position.

Stroller 310 may be collapsed for transportation or storage. To achieve the smallest possible collapsed configuration, it is preferable to collapse stroller 310 from the first operable position shown in FIG. 12. To collapse stroller 310 the operator must first unlock handle assembly 318 by removing the locking pins, or the like from the respective locking holes 380 and 382 (in handle mounting tabs 376 and 378 of lower handle member 368) and locking holes 344 and 346 (in front mounting tabs 340 and 342 of base frame assembly 314). As best seen in FIGS. 13 and 14, once unlocked, handle assembly 318 and rear uprights 322 and 324 will be free to pivot to a collapsed position by the simultaneous pivoting action of lower handle member 368 relative to rear uprights 322 and 324 at pivot points 372 and 374, and rear uprights 322 and 324 relative to rear cross member 320 at pivot points 336 and 338.

With handle assembly 318 and rear uprights 322 and 324 free to pivot, the operator may pivot rear uprights 322 and 324 forward and toward the ground while guiding the lower portion of handle assembly 318 forward and downward as shown in FIG. 13. The operator may then lift the front wheel (not shown) of stroller 310 and pivot handle assembly 318 to a fully collapsed position below base frame assembly 314 as shown in FIG. 14.

The overall length of stroller 310 may be minimized when in the collapsed position, by unlocking handle locking means 364 and 366 and pivoting upper handle member 362 to the upright collapsed position shown in FIG. 14. Finally, the width of collapsed stroller 310 may be reduced by removing the rear wheels.

It will be appreciated that stroller 310 could be configured to be symmetrical (side to side), with a pair of slidingly engaged front extension tubes.

Fourth Preferred Embodiment

Figure 15:
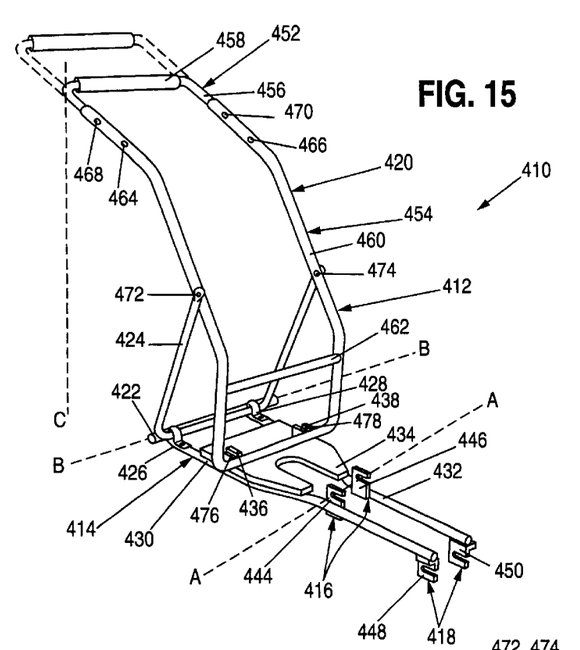
FIG. 15 is a perspective view of the frame assembly of a fourth preferred embodiment of the convertible child stroller, and with a second operable handle position shown in phantom.

Turning now to FIG. 15, an alternative fourth preferred embodiment of the present invention is shown without wheels or a child carrier. More particularly, FIG. 15 shows a frame assembly 412 of convertible stroller 410. The preferred materials used for the various components of the first preferred embodiment, as well as the preferred methods of connecting those components, apply to stroller 410 of the fourth preferred embodiment and will therefore not be repeated hereafter.

The frame assembly 412, best seen in FIG. 15, further comprises a base frame assembly 414, a first front wheel support assembly 416, a second front wheel support assembly 418, and a handle assembly 420 that extends rearward of the base frame assembly 414.

The base frame assembly 414 comprises a rear cross member 422, U-shaped rear member 424, rear couplings 426 and 428, right frame member 430, left frame member 432, and base plate 434. Tubular rear cross member 422 is fixedly attached to the rear end of right and left frame members 430 and 432, respectively. U-shaped rear member 424 is pivotally connected to right and left frame members 430 and 432 by rear couplings 426 and 428, respectively. Rear couplings 426 and 428 are fixedly attached to right and left frame members 430 and 432, respectively. Base plate 434 is preferably of rigid construction and made of metal or high strength plastic. Base plate 434 is fixedly attached to right and left frame members 430 and 432, and serves as a step plate to aid the child's ingress into the child carrier (not shown) while tending to maintain the parallel relationship between the forward portions of right and left frame members 430 and 432. Base plate 434 has upright front mounting tabs 436 and 438 fixedly attached to its upper surface. Front mounting tabs 436 and 438 have locking holes 440 and 442, respectively (best seen in FIG. 16).

As best seen in FIG. 15, first front wheel support assembly 416 comprises a pair of upward extending front wheel mounting brackets 444 and 446. Second front wheel support assembly 418 comprises a pair of downward extending front wheel mounting brackets 448 and 450. Upward extending front wheel mounting brackets 444 and 446 are fixedly attached to the parallel forward portion of right and left frame members 430 and 432, respectively, forward of base plate 434. Downward extending front wheel mounting brackets 448 and 450 are fixedly attached to the front end of right and left frame members 430 and 432, respectively.

Handle assembly 420 comprises upper handle assembly 452, and lower handle assembly 454. Upper handle assembly 452 includes U-shaped upper handle member 456, and handle grip 458.

Lower handle assembly 454 includes U-shaped lower handle member 460, and lateral support member 462. The open distal ends of the side legs of U-shaped lower handle member 460 slidingly receive the side legs of upper U-shaped handle member 456. Upper handle member 456 preferably carries conventional locking means such as push pins for locking engagement with the side legs of lower handle member 460 at first locking points 464 and 466, or at second locking points 468 and 470, respectively. The downwardly sloping side legs of lower handle member 454 are pivotally connected to the distal ends of rear member 424 at pivot points 472 and 474, respectively. Lateral support member 462 is fixedly attached between the sides of U-shaped lower handle member 460. Handle mounting tabs 476 and 478 are fixedly attached to the rearward side of the base leg of lower handle member 454. Handle mounting tabs 476 and 478 have locking holes 480 and 482, respectively (best seen in FIG. 16).

Handle assembly 420 may be releasably locked in an upright operable position (as shown in FIG. 15) by aligning the respective locking holes 480 and 482 in handle mounting tabs 476 and 478 with locking holes 440 and 442 in front mounting tabs 436 and 438 of base frame assembly 414, (best seen in FIG. 16) and inserting a locking pin, bolt or the like therethrough.

A child carrier (not shown) would be releasably attached to handle assembly 420 of frame assembly 412 along lower handle member 454 and lateral support member 462. As with the first preferred embodiment, various child carrier configurations may be used.

Referring to FIG. 15, it can be appreciated that a front wheel (not shown) could be rotatably connected in a first operable position to upward extending front wheel mounting brackets 444 and 446 of first front wheel support assembly 416 about a front wheel axis AA. Alternatively, the front wheel could be rotatably connected in a second operable position to downward extending front wheel mounting brackets 448 and 450 of second front wheel support assembly 418, moving front axis AA of the front wheel to a further forward location. To facilitate movement of the front wheel between the first and second front wheel support assemblies 416 and 418, the front wheel of this embodiment preferably would incorporate a quick releasing axle means such as that suggested in the description of the first preferred embodiment.

It can also be appreciated that two rear wheels (not shown) would be rotatably connected to the respective ends of rear cross member 422 about a rear axis BB which is parallel to front axis AA of the front wheel. The rear wheels would be releasably connected to rear cross member 422 in the same manner described in reference to the first preferred embodiment.

When a stroller operator wishes to use the convertible child stroller 410 in relatively confined spaces, the operator may choose a first operable position whereby the front wheel is rotatably connected in a first operable position to upward extending front wheel mounting brackets 444 and 446 about front axis AA of the front wheel. This provides a first wheelbase length defined by the distance between front axis AA and parallel rear axis BB.

As seen in FIG. 15, with the front wheel in the first operable position, the forward portion of right and left frame members 430 and 432 are located generally below front axis AA of the front wheel. It will be appreciated that with upper handle member 456 releasably locked to lower handle member 460 at first locking points 464 and 466, stroller 410 has a first handle position having a first handle extension length defined by the distance between rear axis BB of the rear wheels and an imaginary vertical plane C that is parallel to rear axis BB and passes through the rearward most portion of handle grip 458.

Given a desire to use the stroller 410 for fitness activities or in open spaces, the operator may choose a second operable position. The second operable position may be attained by disconnecting the front wheel from upward extending front wheel mounting brackets 444 and 446, and rotatably connecting the front wheel in a second operable position to downward extending front wheel mounting brackets 448 and 450 of second front wheel support assembly 418. Moving the front wheel forward to attain the second operable position moves front axis AA of the front wheel forward, increasing the distance between front axis AA and rear axis BB, resulting in a longer wheelbase length than when stroller 410 is in the first operable position.

Moving the front wheel to the second operable position causes the forward portion of right and left frame members 430 and 432 to be moved to a position generally above front axis AA of the front wheel. The movement of the forward portion of right and left frame members 430 and 432 relative to front axis AA causes frame assembly 412 to pivot about rear axis BB of the rear wheels, resulting in a second handle position having a relatively longer handle extension length between rear axis BB and imaginary vertical plane C through the rearward most portion of handle grip 458.

It will be appreciated that due to the sliding engagement of upper handle member 456 with lower handle member 460 in this embodiment (which could also be utilized in the first and second alternative preferred embodiments), alternative handle positions, with different handle extension lengths are available by unlocking upper handle member 456 at locking points 464 and 466 and moving upper handle member 456 to second locking points 468 and 470 in lower handle member 460. Thus, the handle assembly 420 of this embodiment may attain four different handle positions with the greatest handle extension length provided when the front wheel is in the second operable position and upper handle member 456 is locked to lower handle member 460 at second locking points 468 and 470.

Figures 16, 17, 18:
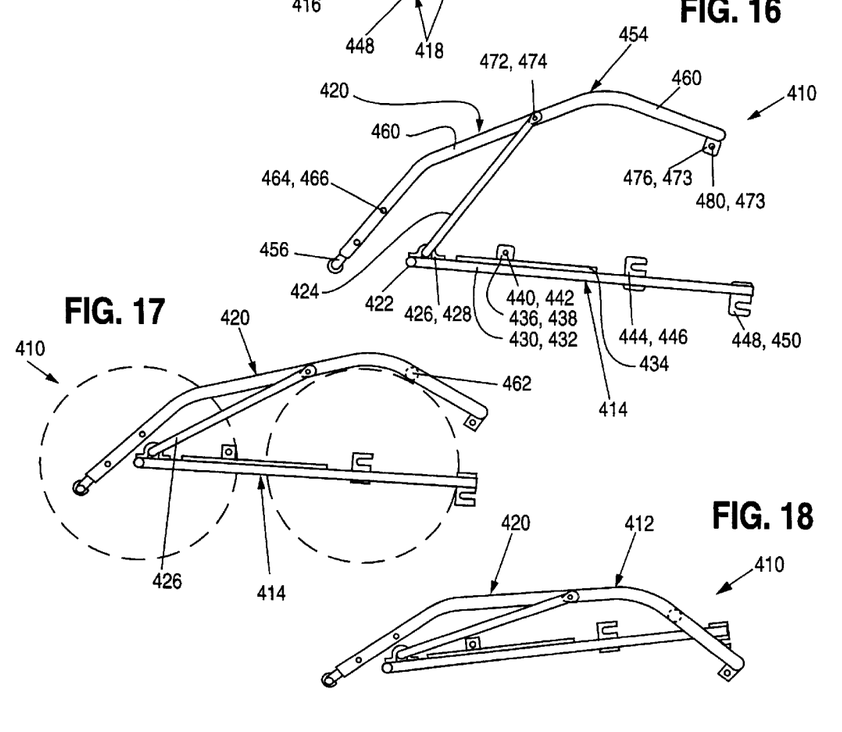
FIG. 16 is a side view of the frame assembly of the fourth embodiment of the stroller in a partially collapsed position.
FIG. 17 is a side view of the fourth embodiment of the stroller in its collapsed position with the child carrier removed and with the wheels and lateral support member shown in phantom.
FIG. 18 is a side view of the frame assembly of the fourth embodiment of the stroller in its fully collapsed position.

Stroller 410 may be collapsed for transportation or storage. To achieve the smallest possible collapsed configuration, it is preferable to collapse stroller 410 from the first operable position where the front wheel is mounted to upward extending front wheel mounting brackets 444 and 446 and upper handle member 456 is releasably locked to lower handle member 460 at first locking points 464 and 466. To collapse stroller 410 the operator must first unlock handle assembly 420 by removing the locking pins, or the like from the respective locking holes 480 and 482 (in handle mounting tabs 476 and 478 of lower handle member 460) and locking holes 440 and 442 (in front mounting tabs 436 and 438 of base frame assembly 414). As best seen in FIGS. 16 and 17, once unlocked, handle assembly 420 and rear member 424 will be free to pivot to a collapsed position by the simultaneous pivoting action of lower handle member 460 relative to rear member 424 at pivot points 472 and 474, and rear member 424 relative to right and left frame members 430 and 432 at rear couplings 426 and 428, respectively.

With handle assembly 420 and rear member 424 free to pivot, the operator may pivot rear member 424 forward and toward the ground while guiding handle assembly 420 forward and downward until (as shown in phantom in FIG. 17) lateral support member 462 rests on the front wheel.

As seen in FIG. 18, removal of the front wheel would allow handle assembly 420 to move downward to rest on top of base frame assembly 414. Removal of the rear wheels would complete the reduction in height, length, and width of stroller 410, and minimize the overall size of the fully collapsed frame assembly 412.

What is claimed is:

1. A stroller comprising:
 a frame assembly;
 at least two rear wheels rotatably connected to said frame assembly;
 at least one front wheel rotatably connected to said frame assembly;
 at least one carrier connected to said frame assembly; and
 wherein said frame assembly is adjustable into first and second carrying operable positions and into an inoperable collapsed position, said front and rear wheels being a first distance apart in said first operable position having a first stroller length, and said front and rear wheels being a second relatively greater distance apart in said second operable position having a second relatively longer stroller length wherein said carrier does not extend forward of a front wheel.

2. A stroller in accordance with claim 1 wherein said frame assembly is pivotally adjustable from said first operable position to said second operable position.

3. A stroller in accordance with claim 1 wherein said carrier comprises a seat assembly.

4. A stroller in accordance with claim 1 wherein said rear wheels are rotatably connected to said frame assembly along a rear axis, said frame assembly further comprises a handle assembly having a rearward most portion spaced apart from said rear axis such that a handle extension length is defined by the distance between said rear axis and an imaginary vertical plane that is parallel to said rear axis and passes through said rearward most portion of said handle assembly, and wherein said handle assembly is adjustable between a first handle position having a first handle extension length and a second handle position having a second relatively longer handle extension length.

5. A stroller in accordance with claim 1 wherein said rear wheels are rotatably connected to said frame assembly along a rear axis, said frame assembly further comprises a handle assembly having a rearward most portion spaced apart from said rear axis such that a handle extension length is defined by the distance between said rear axis and an imaginary vertical plane that is parallel to said rear axis and passes through said rearward most portion of said handle assembly, and wherein said handle assembly automatically moves from a first handle position having a first handle extension length to a second handle position having a second relatively longer handle extension length when said frame assembly is adjusted from said first operable position to said second operable position.

6. A stroller in accordance with claim 1 wherein said frame assembly is slidingly adjustable from said first operable position to said second operable position.

7. A stroller in accordance with claim 6 wherein said frame assembly further comprises at least one telescoping frame member.

8. A stroller in accordance with claim 1 wherein said front and rear wheels are relatively closer together in said collapsed position than when in said first operable position.

9. A stroller in accordance with claim 1 wherein said frame assembly is shorter in height and length in said collapsed position than when in said first operable position.

10. A stroller in accordance with claim 1 wherein said frame assembly further comprises a handle and wherein said handle is closer to said rear wheels in said collapsed position than when in said first operable position.

11. A stroller in accordance with claim 1 wherein said frame assembly is pivotally adjustable into said inoperable collapsed position.

12. A stroller in accordance with claim 1 wherein said frame assembly further comprises a plurality of front wheel mounting supports.

13. A stroller in accordance with claim 1 wherein said frame assembly is asymmetrical relative to an imaginary longitudinal vertical plane through a point midway between said rear wheels.

14. A stroller in accordance with claim 1 wherein said frame assembly further comprises a handle.

15. A stroller in accordance with claim 14 wherein said handle has a gripping portion and is adjustable between a first handle position having a first distance between said gripping portion and a rear wheel and a second handle position having a second relatively greater distance between said gripping portion and said rear wheel.

16. A stroller in accordance with claim 15 wherein said handle is pivotally adjustable from said first handle position to said second handle position.

17. A stroller in accordance with claim 15 wherein said handle is slidingly adjustable from said first handle position to said second handle position.

18. A stroller comprising:

a frame assembly;

at least two rear wheels rotatably connected to said frame assembly;

at least one front wheel rotatably connected to said frame assembly;

at least one carrier connected to said frame assembly; and wherein said frame assembly is adjustable into first and second operable positions and at least one inoperable collapsed position, said front and rear wheels being a first distance apart in said first operable position, said front and rear wheels being a second relatively greater distance apart in said second operable position wherein said carrier does not extend forward of a front wheel.

19. A stroller in accordance with claim 18 wherein said front and rear wheels are relatively closer together in said collapsed position than when in said first operable position.

20. A stroller in accordance with claim 18 wherein said frame assembly is shorter in height and length in said collapsed position than when in said first operable position.

21. A stroller in accordance with claim 18 wherein said rear wheels are rotatably connected to said frame assembly along a rear axis, said frame assembly further comprises a handle assembly having a rearward most portion spaced apart from said rear axis such that a handle extension length is defined by the distance between said rear axis and an imaginary vertical plane that is parallel to said rear axis and passes through said rearward most portion of said handle assembly, and wherein said handle assembly is adjustable between a first handle position having a first handle extension length and a second handle position having a second relatively longer handle extension length.

22. A stroller in accordance with claim 18 wherein said rear wheels are rotatably connected to said frame assembly along a rear axis, said frame assembly further comprises a handle assembly having a rearward most portion spaced apart from said rear axis such that a handle extension length is defined by the distance between said rear axis and an imaginary vertical plane that is parallel to said rear axis and passes through said rearward most portion of said handle assembly, and wherein said handle assembly automatically moves from a first handle position having a first handle extension length to a second handle position having a second relatively longer handle extension length when said frame assembly is adjusted from said first operable position to said second operable position.

23. A stroller in accordance with claim 18 wherein said frame assembly is pivotally adjustable from said first operable position to said second operable position.

24. A stroller in accordance with claim 18 wherein said frame assembly further comprises a plurality of front wheel mounting supports which provide a plurality of front wheel mounting positions.

25. A stroller in accordance with claim 18 wherein said frame assembly is slidingly adjustable from said first operable position to said second operable position.

26. A stroller in accordance with claim 25 wherein said frame assembly further comprises at least one telescoping frame member.

27. A stroller in accordance with claim 18 wherein said frame assembly is pivotally adjustable into said inoperable collapsed position.

28. A stroller in accordance with claim 18 wherein said frame assembly further comprises a handle adjustable between a first handle position having a first distance between said handle and a rear wheel and a second handle position having a second relatively greater distance between said handle and said rear wheel.

* * * * *